United States Patent [19]
Johnson

[11] 3,850,133
[45] Nov. 26, 1974

[54] STRAIN INDICATOR AND METHOD
[75] Inventor: Robert Carol Johnson, Pittsburgh, Pa.
[73] Assignee: Modulus Corporation, Cleveland, Ohio
[22] Filed: Nov. 29, 1972
[21] Appl. No.: 310,445

[52] U.S. Cl. .................. 116/114 R, 73/88, 85/62
[51] Int. Cl. ......................................... G01d 21/00
[58] Field of Search............ 116/114 R, 70, DIG. 24; 73/1, 85.5, 88, 88 E, 88 F; 85/62, 1 R

[56] References Cited
UNITED STATES PATENTS

| | | | |
|---|---|---|---|
| 2,747,454 | 5/1956 | Bowersett | 85/62 |
| 3,137,268 | 6/1964 | Hornwood | 116/114 R |
| 3,194,105 | 7/1965 | Gill | 85/62 |
| 3,220,375 | 11/1965 | Gruber et al. | 116/70 |
| 3,224,316 | 12/1965 | Grikscheit et al. | 85/62 |
| 3,248,923 | 5/1966 | Blakelet | 73/1 |
| 3,589,234 | 6/1971 | Trigg | 85/62 |
| 3,602,186 | 8/1971 | Popenoe | 116/114 R |
| 3,714,859 | 2/1973 | Tupper | 85/1 R |

Primary Examiner—Louis J. Capozi
Attorney, Agent, or Firm—Fay & Sharpe

[57] ABSTRACT

A strain indicator of the type wherein a change in length of a strain member produces a change in color of a visual indicator. An indicator member and a light-absorbing indicator fluid are sealed in a capsule member that also includes a window. The capsule is fastened to the strain member. A change in length of the strain member causes the indicator member to become separated from the window with the result that light-absorbing indicator fluid is caused to flow between the indicator member and the window. The method of the invention comprises method steps of manufacturing subassemblies of the strain indicator as well as the method steps leading to complete assembly of the indicator.

16 Claims, 17 Drawing Figures

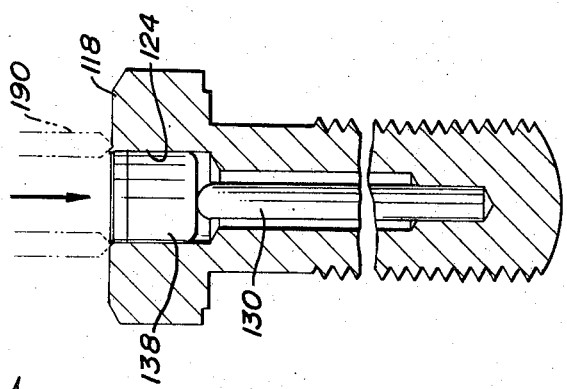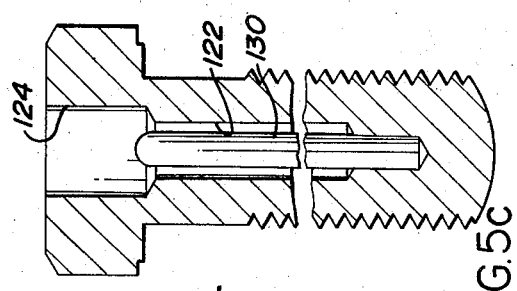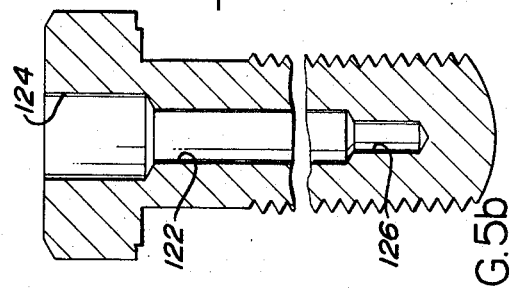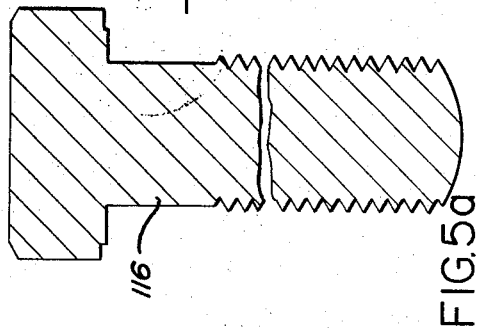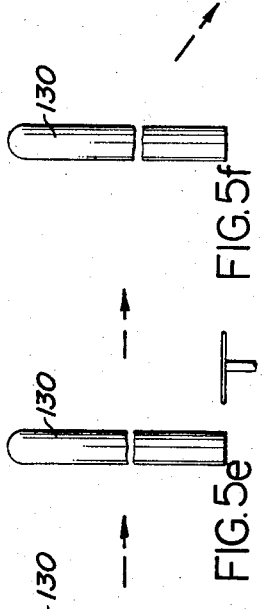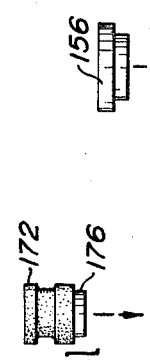

3,850,133

STRAIN INDICATOR AND METHOD

BACKGROUND OF THE INVENTION

This invention relates to strain indicators of the type shown in U.S. Pat. No. 3,602,186 to Charles H. Popenoe. More particularly, this invention relates to a strain indicator apparatus and a method of assembly of a strain indicator apparatus of the type wherein a change in length of a strain member produces a change in color of a visual indicator.

In many assembly operations where fastening devices are used it is desirable to inspect the assembled fastener to determine that it has been taken up an appropriate amount. The fastener may be, for example, a stud, a bolt, a rivet, or the like.

Several prior art techniques have been utilized for determining when a fastener has been properly taken up. One such technique involves the use of a torque wrench in which a specified number of foot pounds may be verified as having been applied to a fastener in the assembly thereof. Other prior art techniques have made use of the fact that take up of a fastener will set up certain stress levels in the fastener which may be measured as, for instance, by means of a stress sensitive material. Still further prior art techniques have made use of the fact that take up of a fastener produces an elongation of the fastener which may be measured utilizing well known techniques such as direct measuring devices.

The above examples demonstrate that fastener take up may be measured by determining either torque, stress or strain values in a fastener.

Since torque, stress and strain are all interrelated, it is possible to determine the stress levels in a fastener knowing the strain of the fastener. Similarly, it is possible to determine torque values knowing the stress imparted to the fastener at any point. Thus, for purposes of illustration, the terms torque, stress, and strain may be used interchangeably. The device of this invention is termed a strain indicator because the elongation of the fastener is being sensed in order to determine a fully made up condition of the fastener. The term strain indicator should not be considered as limiting since in its broadest sense the device of this invention may be considered a stress or torque indicator as well.

In U.S. Pat. No. 3,602,186 there is shown and described a strain indicator of the type wherein a change in length of the fastener causes an indicator area of a pin to separate from a window with the result that light-absorbing indicator fluid is caused to flow between the indicator area and the window. Certain shortcomings have been found in the design of the fastener shown in U.S. Pat. No. 3,602,186 principally related to problems encountered in the manufacture of the fastener.

These shortcomings, which will be described more fully hereafter, have led to the development of an improved strain indicator as well as the development of a method of assembly of an improved strain indicator.

SUMMARY OF THE INVENTION

Briefly summarized, the strain indicator of this invention comprises a threaded bolt having a bore extending from the bolt head into the body. A pin member is received within the bore. The inner end of the pin member is fixed to the fastener by means of an adhesive. The free end of the pin is disposed adjacent a fluid holding member or capsule which itself is attached to the fastener. The fluid holding member is comprised of a capsule body and a window. An indicator member is disposed within the fluid holding member. A brightly colored indicator area is provided at one end of the indicator member and is adapted to be disposed adjacent the window of the capsule. The entire capsule is filled with a light-absorbing indicator fluid. The free end of the pin exerts a bias against the bottom wall of the capsule causing the indicator area to be maintained in a position closely adjacent the window of the capsule. As the length of the threaded fastener is changed during take up, the indicator area separates from the window as the bias imparted to the capsule by the pin is removed. The indicator area subsequently separates from the window with the result that light-absorbing indicator fluid is caused to flow between the indicator area and the window. The fluid absorbs the color of the indicator area giving a visual indication that proper take up of the bolt has been accomplished.

The method of this invention broadly encompasses the manufacturing steps of:

a. providing a threaded bolt subassembly;
b. providing an indicator subassembly which includes a capsule having a window, fluid, and an indicator member sealed therein;
c. providing a pin member subassembly;
d. fastening the pin member subassembly to the threaded bolt subassembly; and
e. fastening the indicator subassembly to the threaded bolt-pin member subassembly.

BRIEF DESCRIPTION OF THE DRAWINGS

A more complete description of the invention will now be made with reference to the accompanying drawings in which:

FIGS. 5(a) – 5(m) are elevational and cross-sectional views showing the various elements of the apparatus of this invention during assembly utilizing the method steps of this invention.

ANALYSIS OF PRIOR ART FASTENER

Figure 1:
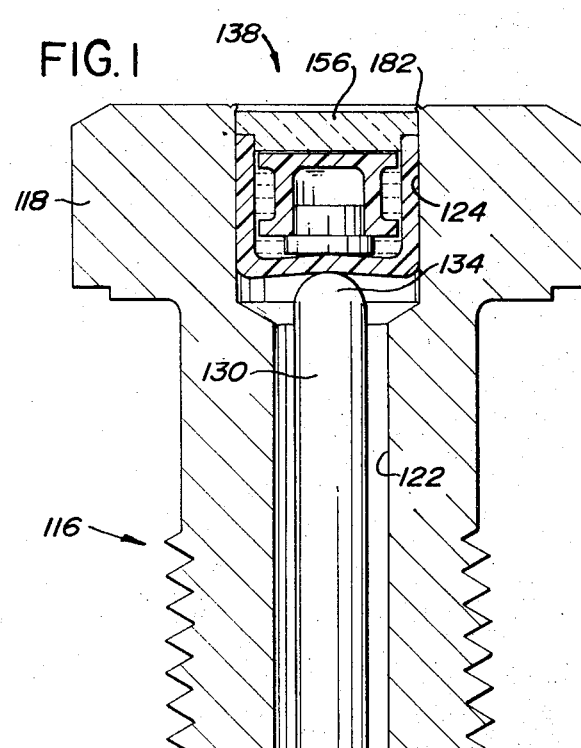
FIG. 1 is an elevational cross-sectional view of the preferred embodiment of the apparatus of this invention.
Figure 3:
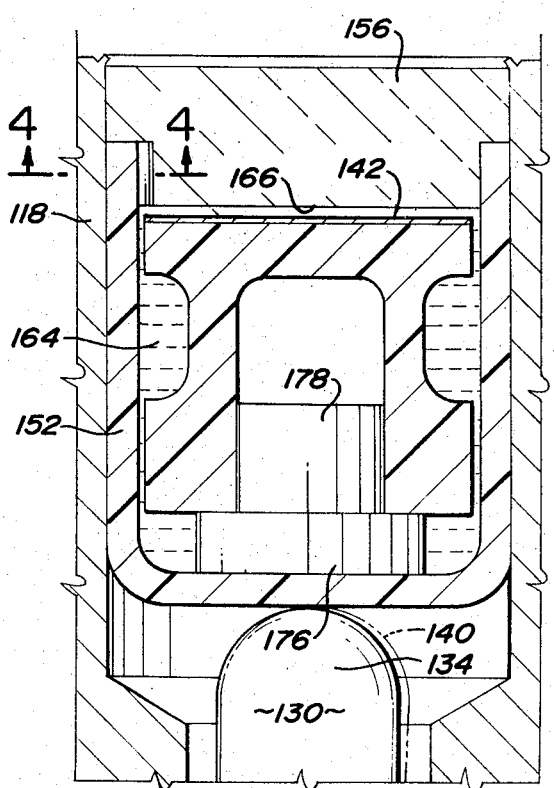
FIG. 3 is an enlarged fragmentary elevational cross-sectional view of the indicator portion of the apparatus of this invention with the fastener in a stressed condition and showing the indicator area separated from the window.

Before proceeding with a detailed description of the preferred embodiment of the apparatus of this invention, reference will be made initially to a prior art fastener as is described in U.S. Pat. No. 3,602,186. There is shown in FIG. 1 of U.S. Pat. No. 3,602,186 a fastener 2 having a head 3 and external threads 4. An axial bore 6 is drilled from the head of the fastener into the body. A counterbore 7 is provided for the purpose of enlarging the recess at the head end. A loosely fitting pin 8 is inserted into the bore 6 and is fastened to the bolt at the blind end 9 by means of a press fit. The head of the pin 8 terminates in a disc 11 having a face or indicator area 12 which is preferably provided with a highly visible coating of a bright color such as red-orange. A window 13 of glass, plastic or any other suitable transparent or translucent material is fixed to the visible face of the bolt head 3, preferably by being inserted flush with the surface as shown in FIG. 3 in a manner such that it rests flush against and in close contact with the indicator area 12. The free space between the pin 8 and the wall of axial bore 6 and counterbore 7 is substantially filled with a light-absorbing fluid 14 of a different color from that of the indicator surface 12, for example, a dense blue or black fluid.

When the indicator area 12 of FIG. 1 is in close contact with the interior surface of the window 13, the light-absorbing indicator fluid 14 is substantially displaced from between such members so that the bright color of the indicator area is visible through the window. When, however, the fastener becomes elongated due to stress placed upon it, the window 13 separates from the indicator area 12 permitting the light-absorbing indicator fluid 14 to flow between the two members. When appropriate separation has been achieved, a change in color of the indicator area from a bright to a dark appearance will become apparent to one viewing the indicator area through the window 13.

There are several shortcomings in the prior art fastener as shown in FIG. 1 and in order to better appreciate the apparatus and method of this invention reference will be made to FIG. 1 still further.

Through tests and experience it was determined that the seal required to contain the light-absorbing indicator fluid 14 in the fastener as shown in FIG. 1 of U.S. Pat. No. 3,602,186 without leakage or deterioration was not possible with a metal-to-plastic or metal-to-glass staking operation used to fix the window 13 to the head 3 and to seal the fluid within the head. The design of the fastener of FIG. 1 simply did not lend itself to volume production for the variables of a staking operation were too great to assure the hermetically sealed condition called for in the design.

A second problem encountered in the production of bolts of the type shown in FIG. 1 of U.S. Pat. No. 3,602,186 was that the ability to hold the quality and the tolerances required exceeded normal volume production techniques. Each component of the fastener, as well as the fastener itself, had to be controlled very closely during each manufacturing operation and also during assembly. The control of quality was difficult since standard gauging techniques could not be used to assure proper performance. To elaborate, the surface on which the window was to seat, as well as the interior surface of the window itself, and the contact surface of the pin (the indicator area) had to be maintained to at least 100 microinches finish, squareness, and flatness. This tolerance was not acceptable as a cumulative specification for volume production. In other words, if each of these components were within the specification but the three of them together would not meet the specification, the indicator would be undependable or inaccurate. Also, the placement of the pin with respect to the window and the machined surfaces inside the fastener had to be very closely controlled. Since each of these surfaces were referenced separately, there was no way to correct a misplacement prior to a subsequent operation. The light-absorbing indicator fluid had to be compounded for each fastener and a trial and error visual determination had to be made for each fastener.

Still further production problems were encountered during the assembly process using the design of FIG. 1. A misaligned pin, a slightly concave or convex surface on the pin or window, a poor bond on the pin and the fastener could not be determined until after total assembly. As a result of this condition, it was not possible to tell whether the unit would operate satisfactorily until the final staking operation. At this point a malfunctioning bolt would have to be scrapped in its entirety. Any in-process or subassembly rejections were practically impossible.

Further problems with the prior art fastener as shown in FIG. 1 of U.S. Pat. No. 3,602,186 were encountered in the automating of the assembly. The assembly of the pin to the fastener, the filling of the fastener with light-absorbing indicator fluid, and the placement of the window, required considerable experience and excellent performance to meet an acceptable degree of accuracy. In this respect a paramount problem was the necessity to degass the light-absorbing indicator fluid during assembly. It was found necessary to use special vacuum equipment for this operation. Adding to the complexity of the problem was the fact that the most critical assembly operations had to be performed while the fastener was submerged in light-absorbing indicator fluid with such fluid under a vacuum control.

The apparatus and method of the invention overcome most, if not all, of the shortcomings enumerated above making it possible to produce a reliable stress indicating fastener using assembly line techniques.

CROSS REFERENCE TO A RELATED APPLICATION

U.S. Pat. Application Ser. No. 207,260 filed Dec. 13, 1971, Pat. No. 3,799,108, and assigned to Modulus Corporation, the assignee of the entire interest herein, discloses another improvement in a strain indicator and method.

DESCRIPTION OF THE PREFERRED EMBODIMENT

Turning now to FIG. 1, the apparatus of this invention includes a fastener 116 having a head 118 and external threads 120. Head 118 may be in any desired configuration making it possible to turn the fastener with a suitable tool such as a wrench.

An axial bore 122 is drilled from the head of the fastener a substantial distance into the fastener body. A counterbore 124 is provided at the head 118 in order to receive the indicator unit as will be described more fully hereinafter. A pilot hole 126 is provided within the fastener for the purpose of receiving the pin member 130.

Pin member 130 is provided with a first end 132 adapted to be received within the pilot hole 126 and a second or free end 134 adapted to be disposed adjacent the fluid holding member or capsule 138.

Figure 2:
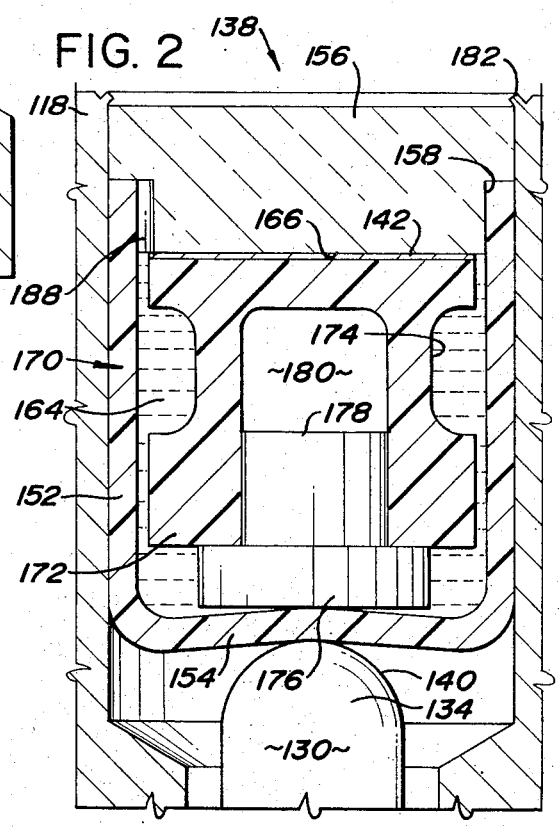
FIG. 2 is an enlarged fragmentary elevational cross-sectional view of the indicator portion of the apparatus of this invention with the fastener in an unstressed condition.

As is shown more clearly in FIG. 2, the free end 134 of pin member 130 is defined by a generally spherical surface 140 which cooperates with the capsule 138 in a manner to be described more fully hereafter.

The first end 132 of the pin member 130 is fastened to the wall defining the pilot hole 126 (FIG. 1) by means of an adhesive 150 which is applied to either one or both of the surfaces of the pin member 130 and the wall of pilot hole 126 prior to assembly. Alternate structures for securing the pin member 130 to the interior wall of the fastener 116 should be considered within the spirit of this invention including, but not limited to, screw threads or a press fit.

While in the embodiment shown in FIG. 1 there is described a bore 122 and a pilot hole 126 it should be understood that within the spirit of this invention are included structures in which the pin member is received and secured directly within the walls defining the bore of the fastener without provision being made for a pilot hole.

Turning now to FIG. 2, capsule 138 is a fluid holding member defined by a capsule body 170 having a side wall 152 and a bottom wall 154. A window 156 is secured to the capsule body in sealing engagement. In the embodiment shown in FIG. 2, window 156 includes a stepped portion 158 received within side wall 152. In the preferred embodiment window 156 is secured to the capsule body by means of adhesive applied to either one or both of the surfaces of window 156 and side wall 152 which come into contact with one another. Alternate structures for joining the window to the capsule body such as sonic welding should be considered within the scope of this invention.

The members 170 and 156 thus cooperate to define a fluid holding member capable of retaining light-absorbing indicator fluid 164 within the confines of such member.

Disposed within capsule 138 is an indicator member 172. The indicator member is provided with an indicator area 142 which is a brightly colored planar surface disposed essentially transverse to the axis of pin member 130. The color selected for the indicator are 142 is preferably a highly visible coating of red-orange. As will be apparent as the description proceeds, other colors may be selected depending upon particular conditions.

As shown in FIG. 2 indicator area 142 is defined by a reflective member secured to the indicator member 172. Such reflective member may alternately comprise a coating or other material secured to or deposited on the indicator member 172. Alternately, the indicator member 172 as shown in FIG. 2 may include an integral coloring in order to define an exposed indicator area highly visible through window 156.

Window 156, in the preferred embodiment of FIGS. 1 and 2, is manufactured from any suitable translucent and resilient material such as acrylic. Alternately, tempered glass such as Pyrex may be used. The internal surface 166 of window 156 is essentially planar and complementary to the indicator area 142 such that in the position shown in FIG. 2 the indicator area 142 is in contact with the internal surface 166 with the result that there is essentially no light-absorbing indicator fluid 164 between these members. In the position shown in FIG. 2, therefore, the brightly colored indicator area 142 is clearly visible through the window 156 and shows an unstressed condition of the fastener.

Turning now to the indicator member itself, it will be seen from FIG. 2 that member 172 is generally cup shaped and includes an annular groove 174 in the side wall thereof. Disposed within the bottom end of the indicator member is a magnet 176 having a projection 178 received within the walls of the indicator member 172. Magnet 176 is secured to the indicator member 172 by means of adhesive applied to either one or both of the surfaces of magnet 176, projection 178 and the indicator member 172 in contact with one another. A free space 180 is defined within the indicator member by the internal walls of the indicator member and the upper end of projection 178 of magnet 176. It should be understood that with the magnet 176 secured to the indicator member 172 it is not possible for light-absorbing indicator fluid 164 to enter free space 180.

As will be evident from FIG. 2, bottom wall 154 of capsule 138 is somewhat resilient. This is due to the fact that the capsule body 170 is fabricated from a suitable molded plastic material having a high resiliency. With the capsule 138 inserted within the head of the fastener as shown in FIG. 2, a slight deformation of the bottom wall 154 takes place as such wall contacts the free end 134 of pin member 130. As a result, a loading or stress is imparted to the capsule as the pin member 130 contacts the bottom wall 154 of the capsule which in turn contacts magnet 176. As a result, the indicator member 172 and the indicator area 142 are caused to be biased into engagement with the internal surface 166 of window 156. Light-absorbing indicator fluid 164 is thus forced out from the interface of the indicator area 142 and the window 156. In the position shown in FIG. 2, therefore, pre-loading of the capsule causes the brightly colored indicator area 142 to be clearly visible through the window 156 thus indicating an unstressed condition of the fastener.

Once assembled in the configuration as shown in FIG. 1, the fastener is in condition for use. When it is taken up and placed in a stressed condition, the fastener will elongate causing the pin member 130 to be moved in a downward direction as shown in FIGS. 1 and 2 relative to window 156. A downward movement of the free end 134 of pin member 130 produces a similar downward movement of magnet 176 and indicator member 172 attached thereto. Such movement is due to the fact that magnet 176 is attracted to the free end 134 of pin member 130. A downward movement of magnet 176 and the attached indicator member 172 causes the indicator area 142 to separate from the window 156. Light-absorbing indicator fluid 164 will then flow between the indicator area and the window causing a change in appearance of the color of the indicator area. This change in appearance is essentially linear in proportion to the depth of film of light-absorbing indicator fluid. If the fluid is very opaque or of very high light-absorbing power, a film thickness on the order of 0.001 inches is sufficient to change the appearance of the bright red-orange color of the indicator area 142 to the characteristic color of the fluid which, in the preferred embodiment, is a deep blue.

The strain at which the change of appearance of the indicator area effectively occurs can be well controlled by controlling the optical density or light-absorbing power of the fluid. It has been found in practice that the fastener can be calibrated to show the change in color of the indicator area within ten percent of a precalculated strain specification.

The slight elongation of the fastener during take up which produces a gap between the indicator member 172 and the window is elastic. Thus, the strain indicator is reversible and if the fastener should become loosened the bright color of the indicator area 142 will become visible thereby providing warning of the loose condition.

In the preferred embodiment the light-absorbing indicator fluid 164 is a mineral oil in which has been dissolved a dye powder. Other fluid compositions should be considered within the spirit and scope of this invention.

When positioned as shown in FIG. 2, the capsule 138 is fastened to the wall of counterbore 124 by means of an adhesive applied to either one or both of the respective surfaces of the fastener and the capsule. Also, the capsule 138 is staked within the head 118 of the fastener at several points 182 about the circumference of the window 156. In the preferred embodiment three staking points 120° apart are utilized to firmly fix the capsule within the head of the fastener. Other fastening means should be considered within the spirit of this invention.

The spherical surface 140 on the free end 134 of pin member 130 serves to define a relatively blunt surface engaging the bottom wall 154 of the capsule body. Thus, there is a minimum of biting or cutting into the bottom wall 154. Spherical surface 140 also minimizes alignment problems associated with pin member 130 and capsule 138. While it is preferred that pin member 130 should be disposed within the fastener coaxial with the axis of the fastener, manufacturing and other considerations may produce a slight amount of misalignment of the pin member with respect to the fastener. The spherical surface 140 at the free end of the pin member serves to reduce problems associated with misalignment of the pin member and the capsule as is shown in FIG. 3.

It will be noted that in the position shown in FIG. 2 (i.e., the unstressed condition of the fastener) there is a loading placed on the capsule by the pin member 130. This preloading of the capsule by the pin member serves to insure that the indicator area 142 of the indicator member 172 is in constant contact with the window 156 regardless of the orientation of the fastener. Thus, should the fastener be installed in an inverted position the pre-loading of the capsule insures that the indicator area 142 is in contact with window 156. As the fastener is taken up in assembly and the pin member 130 is pulled away from the capsule 138, pre-loading is eliminated and the indicator member 172 is caused to be pulled away from the window 156 producing an apparent change in color of the indicator area 142 as light-absorbing indicator fluid 164 is caused to flow between the indicator member 172 and the window 156.

The stressed condition of the fastener is shown in FIG. 3. The gap between the indicator surface 142 and the internal surface 166 of window 156 is approximately of the order of 0.005 inches which is approximately equal to the amount of travel of the free end 134 of the pin member 13. Variations in gap thickness may be provided for depending upon conditions.

The design of the preferred embodiment as shown in FIG. 2 shows a complete encapsulation of the indicator member. All internal space within the capsule 138 except free space 180 is completely filled with the light-absorbing indicator fluid 164.

In order to compensate for changes in volume of the fluid as, for example, due to temperature or pressure changes, free space 180 acts as a self contained air chamber designed to absorb changes in internal pressure. Annular groove 174, previously described, serves to impart some resiliency to the side wall of the indicator member 172 making it possible to compensate for changes in volume of the light-absorbing indicator fluid.

As has been previously indicated, the entire internal space within the capsule 138 (except free space 180) is filled with indicating fluid. There is a complete absence of air entrainment. As will be described more fully hereafter in connection with the description of the method of this invention, one or more escapement passages 188 are defined in window 156 for the purpose of allowing excess indicator fluid 164 to escape from the capsule during assembly. By initially filling the capsule with more fluid than is required the possibility of air entrainment within the capsule is severely reduced if not eliminated entirely during assembly.

The fastener of this invention will function properly in any position. Magnet 176 is constantly attracted to the free end 134 of the pin member 130 so that even in an inverted position the window of a properly torqued fastener will remain dark.

In the preferred embodiment the capsule body is fabricated from a suitable molded plastic material having an operating temperature range of −50°F to +400°F. Such a material may be one of the fluorocarbons. The window 156 is fabricated from a clear acrylic or equally suitable material and is stable over a 450°F range. Heat resistant glass may also be used. Magnet 176 is, in the preferred embodiment, a permanent Alnico magnet. The indicator member 172 is made of a suitable molded plastic material similar to that employed in the capsule body. The pin member 130 is manufactured of ferrous material preferably low carbon steel in order to be attracted to magnet 176. The adhesives used in order to join window 156 to capsule body 170 and the capsule body 170 to the internal wall of the fastener head 118 may be any suitable type known to those skilled in the art capable of holding over a wide temperature range.

Method of Assembly

Turning now to FIGS. 5(a) – 5(m), the method of assembly of this invention will now be described.

As the description proceeds it will become obvious that the method of this invention essentially the production of subassemblies to produce a complete fastener. involves Starting with FIG. 5(a) the first step in the method of this invention is the providing of a threaded fastener 116 which, in the preferred embodiment, is a standard bolt having alloy, thread and fit characteristics specified by the customer. In machining operations on the threaded bolt subassembly a bore 122 is first drilled as shown in FIG. 5(b). Thereafter, a counterbore 124 (FIG. 5(b)) is drilled. Bore 122 should be slightly larger than the diameter of the pin member 130. Similarly, counterbore 124 should be slightly larger than the diameter of the capsule 138.

After drilling the bore and counterbore the bolt subassembly is then cleaned and if required it is heat treated. Thereafter a pilot hole 126 is drilled as shown in FIG. 5(b). This completes machining of the threaded bolt subassembly.

Figure 4:
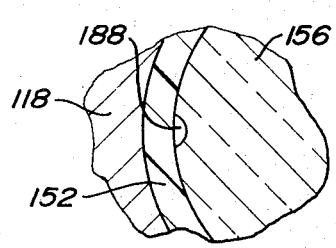
FIG. 4 is an enlarged fragmentary elevational cross-sectional view taken along the line 4—4 of FIG. 3.

The indicator subassembly starts with the providing of a generally cup-shaped capsule body 170 as shown in FIG. 5(g). A magnet 176 is joined to an indicator member 172 as shown in FIGS. 5(k) and 5(l). The indicator member including the magnet attached thereto is then placed in the capsule body as shown in FIG. 5(h). Before attaching window 156 a light-absorbing indicator fluid 164 is placed in the capsule body. The fluid fill is a premeasured amount of fluid which substantially fills the entire fluid holding area as shown in FIG. 5(i). As window 156 is brought into contact with capsule body 170 excess fluid is forced out of the capsule through escapement passages 188 shown more clearly in FIGS. 2 and 4. Upon joining window 156 to capsule body 170 by an adhesive or other means the indicator subassembly is then complete as shown in FIG. 5(j).

The pin subassembly starts with the providing of a pin member 130 as shown in FIG. 5(d). The length of pin member 130 is initially deliberately made longer than required as the pin is measured and cut to the exact length as shown in FIG. 5(e). The precise length is determined by a simple gauge inserted within the drilled bolt subassembly which measures the depth of the bore 122. After gauging and cutting, the pin member subassembly as shown in FIG. 5(f) is then joined to the threaded bolt subassembly by placing a small amount of adhesive on either one or both of the surfaces of the pin member and the threaded fastener and thereafter joining these members together as shown in FIG. 5(c).

Finally, the indicator subassembly of FIG. 5(j) is joined to the threaded bolt subassembly of FIG. 5(c) by placing the capsule 138 into the counterbore 124 as shown in FIG. 5(m). Prior to inserting the capsule into the threaded bolt subassembly an adhesive is placed on either one or both of the surfaces of the wall defining counterbore 124 and the capsule. Once in place as shown in FIG. 5(m) an axial force is applied to the capsule to bring it into engagement with the pin member 130. The axial force as indicated graphically by the arrow in FIG. 5(m) is sufficient to pre-load the capsule by deforming the bottom wall 154 of the capsule as shown in FIG. 2. With the axial force applied to the capsule it is then staked into the head 118 by means of a generally annular staking tool 190. The pre-loaded capsule 138 is thus securely attached to the fastener and upon removal of the compressive force and the staking tool the fastener is ready for testing and use. If necessary, the completed fastener may undergo a cure cycle in a continuous oven in order to cure the adhesive at the capsule and the pin member.

Advantages

There are a number of advantages to the fastener of this invention as well as the method of assembly thereof.

A principal advantage is that the fastener lends itself to production utilizing assembly-line techniques in which subassemblies are produced and inspected and thereafter joined together. Of principal significance is the fact that the light-absorbing indicator fluid is fully encapsulated. Furthermore, the pin member is completely out of contact with the fluid.

A further advantage of the apparatus and method of this invention is that the capsule is initially pre-loaded with the fastener in an unstressed condition with the result that there is a positive visual indication of the unstressed condition of the fastener. As torque is applied to the fastener during take up, the pre-loading force is removed from the capsule with the result that a visual indication of take up is given.

A still further advantage of the apparatus and method of this invention is the structure of the indicator wherein volume changes in the fluid are compensated for by a free space within the indicator member.

Modifications of the Invention

Throughout the description of the invention reference has been made to a strain member and the elongation of a strain member which produces an apparent change of color of an indicator. Within the spirit of this invention should be considered compression members in which a shortening of the length of a member causes a window initially separated from an indicator area to come in contact with it producing it similar but opposite apparent change in color of the indicator to an observer. This invention, therefore, should be considered sensitive to any change in length of a member whether it be an increase in length or a decrease in length.

While in the preferred embodiment a magnet has been used to operatively interconnect the indicator member with the free end of the pin member, other structures to achieve a similar result should be considered within the spirit of the invention. Thus, for example, in lieu of a magnet, recesses could be provided within the indicator area 142 or the indicator member 172 in which to receive one or more spring members in order to impart a bias to the indicator member 172 away from window 156. Such spring members could act to maintain the capsule wall in constant contact with the pin member 130 as torque is applied to the fastener.

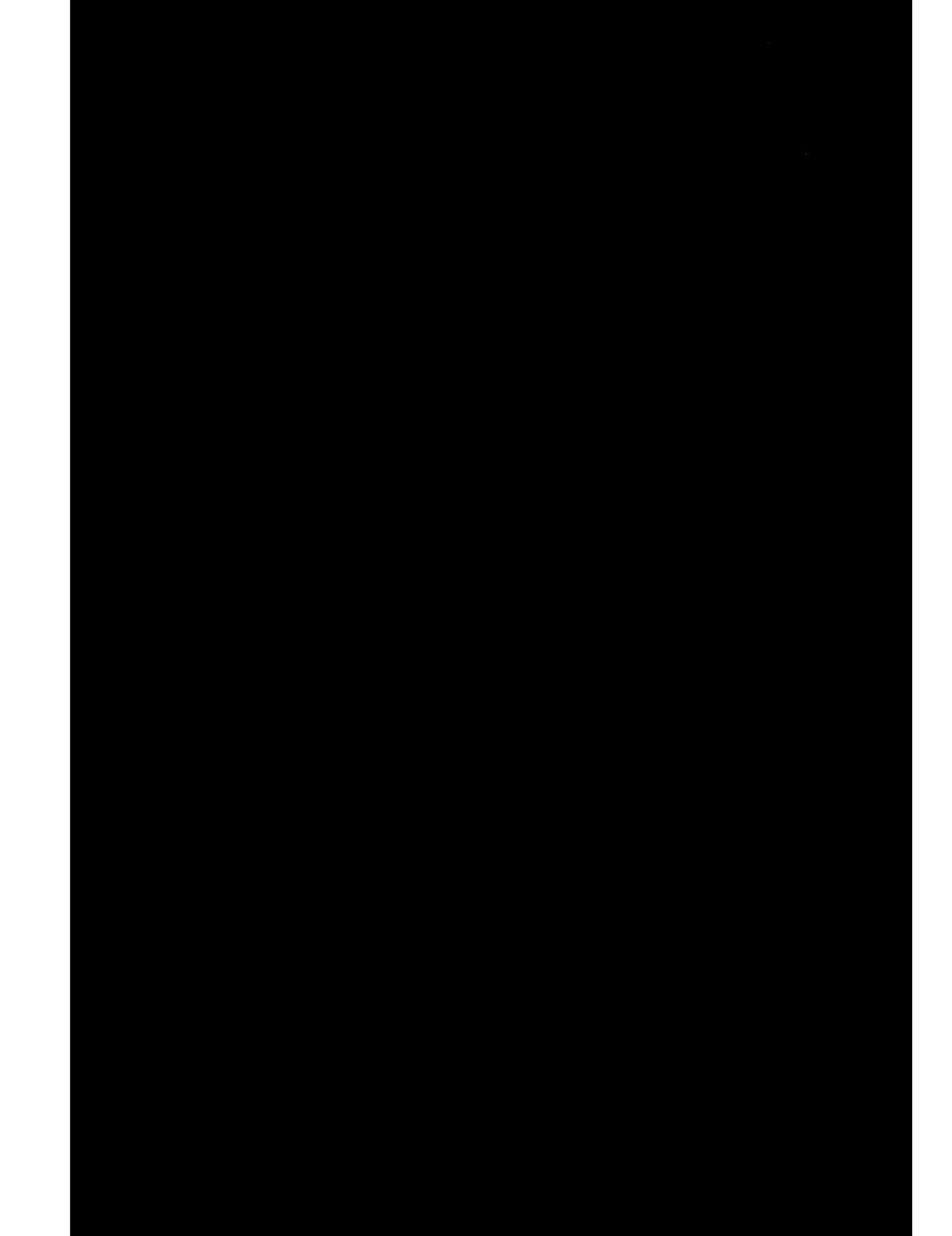

What is claimed is:

1. An indicator comprising in combination:
a first member,
a second member fastened to said first member and having a first end and a second end,
a fluid holding member having a window,
said second member being located entirely outside of said fluid holding member,
said fluid holding member fastened to said first member adjacent said second end of said second member,
a light-absorbing indicator fluid in said fluid holding member,
an indicator member disposed in said fluid, said indicator member including an indicator area disposed substantially adjacent said window,
means maintaining said indicator area in close proximity to said window with said first member in an unstressed condition,
means operable to move said indicator member in response to movement of said second member, whereby;
upon a change of length of said first member as a result of a stressed condition in said first member said second member and said indicator member are caused to move and said indicator fluid is caused to flow between said indicator area and said window thus giving a visual indication of a change in length of said first member.

2. An indicator comprising in combination:
a first member,
a second member fastened to said first member,
a fluid holding member having a window and a contact wall,